United States Patent
Fodrea

[15] 3,645,147
[45] Feb. 29, 1972

[54] TRANSMISSION

[72] Inventor: James W. Fodrea, 2783 Charter Blvd. Apt. 107, Troy, Mich. 48084

[22] Filed: Nov. 10, 1969

[21] Appl. No.: 875,271

[52] U.S. Cl. ............................................. 74/375, 74/745
[51] Int. Cl. .................................... F16h 3/08, F16h 3/02
[58] Field of Search .......................... 74/375, 745; 192/3.5

[56] References Cited

UNITED STATES PATENTS

| | | | |
|---|---|---|---|
| 2,808,738 | 10/1957 | Bartell | 74/701 |
| 2,427,652 | 9/1947 | Banker | 74/375 |
| 2,618,979 | 11/1952 | Benning | 74/75.4 |
| 2,817,425 | 12/1957 | Banker | 192/3.5 |
| 2,997,143 | 8/1961 | Steadman et al. | 74/745 X |
| 3,088,336 | 5/1963 | Fodrea | 74/745 |
| 3,245,278 | 4/1966 | Mattausch | 74/333 |
| 3,403,568 | 10/1968 | Holcombe | 74/333 |

Primary Examiner—Arthur T. McKeon
Attorney—Warren E. Finken, A. M. Heiter and John P. Moran

[57] ABSTRACT

A transmission including a die cast transmission housing which is readily convertible for use with three-, four-, or five-speed, sliding gear, fully synchronized transmission assemblies, which assemblies may be accomplished on the motor vehicle, thereby eliminating the need for separate transmission assembly facilities, and, when used as a five-speed transmission, including a novel first and reverse duplex gear arrangement in the rear extension housing.

12 Claims, 11 Drawing Figures

INVENTOR.
James W. Fodrea
BY
John P. Moran
ATTORNEY

INVENTOR.
James W. Fodrea
BY John P. Moran
ATTORNEY

INVENTOR.
James W. Fodrea
BY
John P. Moran
ATTORNEY

TRANSMISSION

This invention relates to transmissions and more particularly to sliding gear, fully synchronized, multispeed and reverse transmissions.

This transmission provides die cast aluminum clutch housing, transmission case and extension housing, wherein the rear portion of the clutch housing serves as the forward wall of the transmission case and the rear portion of the latter serves as the forward wall of the extension housing. The rear portions of the clutch housing and transmission case are formed such that they cooperate with open forward ends of the transmission case and the extension housing, respectively, to permit the assembly of the transmission on the vehicle, without having to completely assemble a transmission prior to final assembly on a motor vehicle. In other words, predetermined openings formed in the rear portions of the clutch housing permit the assembly of the countershaft and its cluster of gears and the main shaft and several of its gears on the clutch housing prior to the mounting thereon of the transmission case. Openings formed on the rear portion of the latter then support the free ends of the two shafts prior to the mounting of the reverse idler gear and the shaft and any additional gears on the main shaft extension. This is followed by the mounting of the extension housing thereon.

Additionally, the transmission case and extension housing are formed such that they are adaptable for use with three-spaced transmission components, or may be altered slightly to be suitable for either four-speed or five-speed transmission components, incorporated therein in a novel arrangement.

Accordingly, an object of the invention is to provide improved means for assembling a transmission on a motor vehicle.

Another object of the invention is to provide a transmission which may be readily converted from a three-speed arrangement into either a four-speed or five-speed arrangement.

A further object of the invention is to provide a five-speed transmission wherein the first ratio input gear is formed on an extension shaft mounted in the extension housing on the end of the countershaft, and a cooperating first and reverse duplex gear is mounted on the main shaft extension in the extension housing.

Still another object of the invention is to provide an improved die cast clutch housing wherein the clutch gear bearing retainer is cast as a part thereof.

A still further object of the invention is to provide an improved thrust bearing arrangement for transmission main shafts.

A still further object of the invention is to provide an improved transmission countershaft arrangement.

These and other objects and advantages of the invention will become more apparent when reference is made to the following description and accompanying drawings, wherein:

FIG. 9 and 11 are fragmentary cross-sectional views of two embodiments of a five-speed transmission embodying the invention.

THREE-SPEED TRANSMISSION

Figure 1:
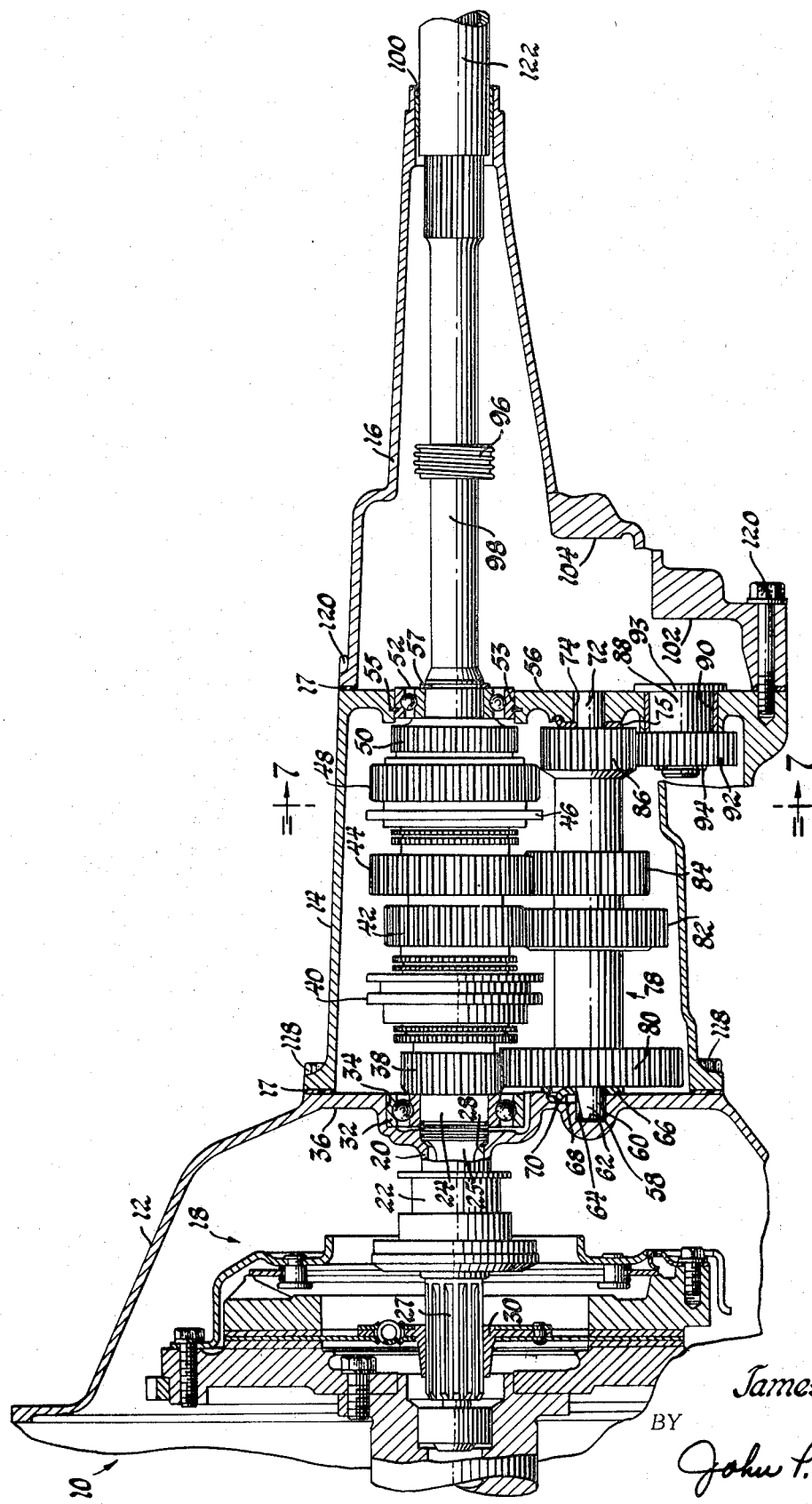
FIG. 1 is a cross-sectional view of a three-speed transmission embodying the invention.

Referring now to the drawings in greater detail, the three-speed transmission 10 of FIG. 1 includes a forward-mounted die cast aluminum clutch housing 12, a centrally mounted die cast aluminum transmission case 14 and a rear-mounted die cast aluminum extension housing 16 separated by gaskets 17.

Figure 2:
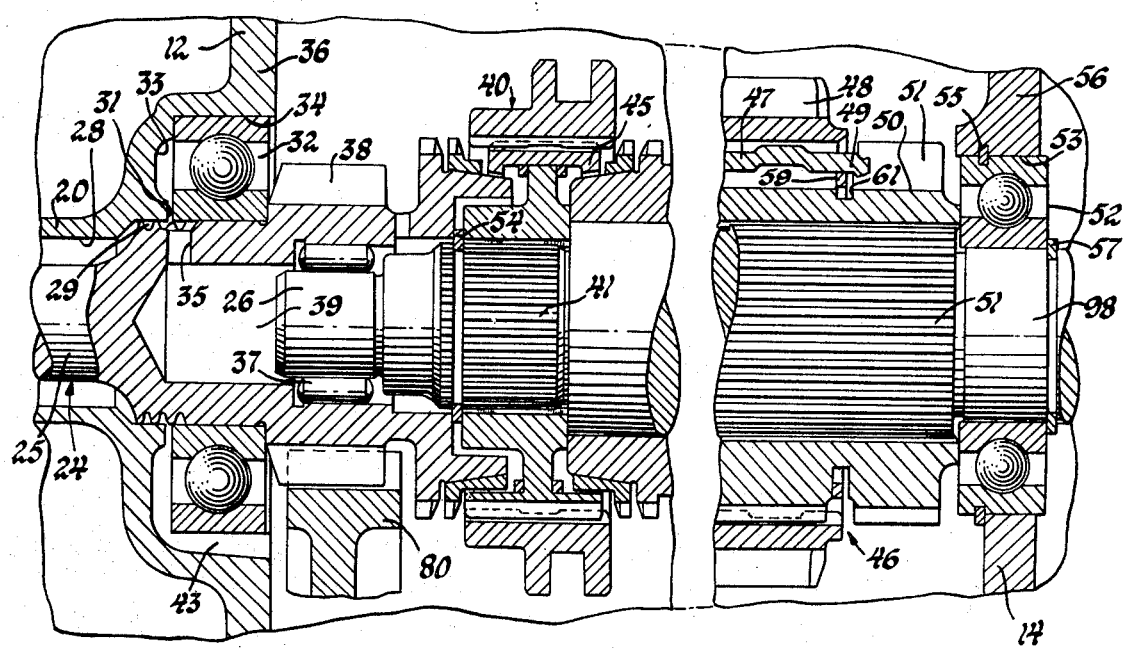
FIG. 2 and 3 are enlarged cross-sectional views of portions of FIG. 1.

Included in the clutch housing 12 is a clutch mechanism 18 which is fully illustrated and described in U.S. Pat. No. 2,770,341 which issued on Nov. 13, 1956 in the name of Marvin T. Wobrock, and will not hereinafter be described. However, it should be noted that the clutch housing 12 is die cast to include a cylindrical throwout bearing support sleeve 20 suitable for supporting the usual clutch throwout bearing 22. A main shaft 24, comprising interrelated front and rear shaft portions 25 and 26 (FIG. 2), respectively, includes splines 27 formed on the forward end 25 thereof which extends through the opening 28 formed by the cylindrical throwout bearing support sleeve 20 and engages the usual splined sleeve 30 of the clutch mechanism 18. Bearings 32, mounted in a recess 34 formed in the rear wall 36 of the clutch housing 12, support the front portion 25 of the main shaft 24, and needle bearings 37 (FIG. 2) are mounted in a counterbored opening 39 formed in the rearward end of the shaft portion 25 for the insertion of the forward end of the shaft portion 26. The bearings 32 are lubricated by splash from the walls of the transmission. A threaded portion 29 formed on the shaft 25 adjacent on oil passage 31 serves as a hydrodynamic seal to prevent leakage from the housing 14. An annular groove 33 formed at the forward end of the recess 34 communicates with a drain passage 43 formed in the recess 34 beneath the bearings 32. A vent or breathe hole 35 is formed through the wall of the shaft 25, communicating between the central opening 39 and the threaded portion 29.

Mounted on the main shaft 24 in the transmission case 14 are an input gear 38 on the main shaft front portion 25, a scond-third synchronizing device 40 including the usual synchronizer plate 45 on splines 41 (FIG. 2) formed on the main shaft rear portion 26, and, also on the main shaft rear portion 26, a second ratio output gear 42, a first ratio output gear 44, a first ratio synchronizing device 46 including a synchronizer plate 46, a reverse output gear 48 and a splined hub 50, the latter being mounted on splines 51 (FIG. 2) formed on the main shaft rear portion 26 and supporting the first ratio synchronizing device 46. A key 49, formed on the plate 47, extends into a milled slot 51 formed in the hub 50 to retain a ring member 59 in an annular groove 61 in the hub 50 adjacent the gear 48.

Bearings 52, mounted in an opening 53 formed in the rear wall 56 of the transmission case 14, support the rear portion 26 of the main shaft 24. The members 40, 42, 44, 46, 48, 50 and 52 have heretofore been held in place by retaining rings 54 (FIG. 2), 55 and 57 (FIGS. 1 and 2), the rings 54 and 57 being secured to the rear shaft 26 and the ring 55 being secured to the transmission case 14, but may be secured in an improved manner as will be hereinafter described.

Figure 3:
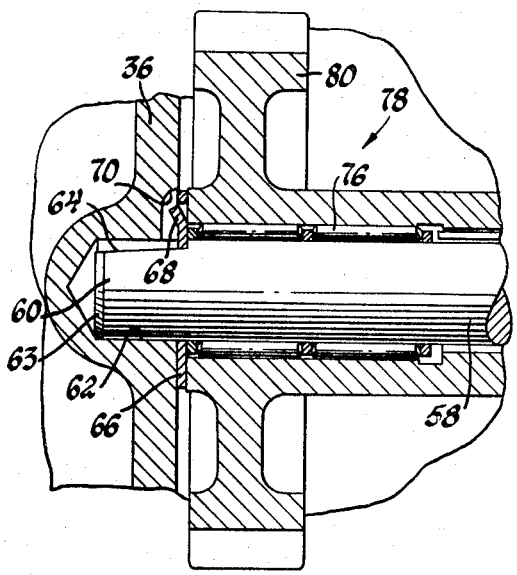
Figure 4:
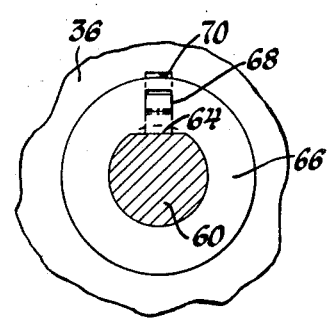
FIG. 4 is a cross-sectional view taken along the plane of line 4—4 of FIG. 3, as if FIG. 3 were a full round view, and looking in the direction of the arrows.

A countershaft 58 (FIG. 3) is supported at its forward end 60 in a pocket or opening 62 formed in the rear wall 36 of the clutch housing 12. A chamber 63 id formed on each end of the countershaft 58 to serve to pilot the shaft 58 into the openings 62 and 74 (FIG. 1). A tapered flat 64, better seen in FIG. 3, is formed on the forward end 60, and a retainer 66 is mounted around the end 60 on the tapered flat 64 and retained in position either in a notch formed at the higher end (FIG. 3) of the tapered flat 64 or by staking. A projection 68 formed on the retainer 66 extends into a recess or slot 70 formed in the rear wall 36 of the clutch housing 12 and prevents the countershaft 58 from rotating. The other end 72 of the countershaft 58 is mounted in the opening 74 formed in the rear wall 56 of the transmission case 14 and may include a retainer 75 similar to retainer 66. Needle bearings 76 (FIG. 3) mounted on the countershaft 58 at both ends thereof serve to rotatably support a gear cluster 78 which includes a drive gear 80, a second ratio input gear 82 (FIG. 1), a first ratio input gear 84, and rear countergear 86, the bearings 76 and the gears 80, 82, 84 and 86 being held together by the retainers 66 and 75.

A reverse idler shaft 88 is mounted in a third opening 90 formed in the rear wall 56 of the transmission case 14. The shaft 88 rotatably supports a reverse idler gear 92 which meshes with the rear countergear 86. The shaft 88 is retained in position by a flange 93 abutting against the outside surface of the wall 56 and a retainer ring 94 adjacent the forward face of the reverse idler gear 92.

A speedometer drive gear 96 is mounted on the extension 98 of the main shaft 24 in the extension housing 16. Bearings 100 support the main shaft extension 98 at the rear of the extension housing 16. Bosses 102 and 104 are formed on an inside surface of the extension housing 16 for a purpose to be described. The boss 102 is aligned with the axis of the reverse idler shaft 88, and the boss 104 is aligned with he axis of the counter shaft 58.

Figure 7:
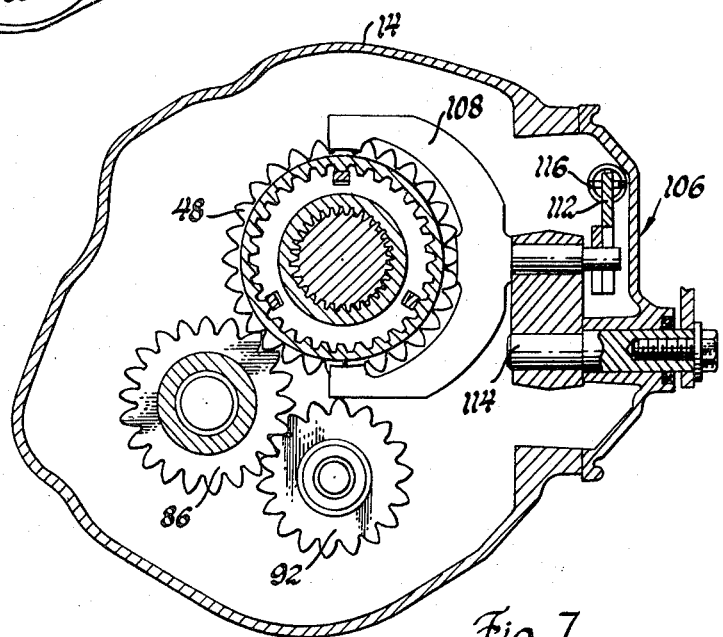
FIG. 7 is a cross-sectional view taken along the plane of line 7—7 of FIG. 1, and looking in the direction of the arrows.
Figure 8:
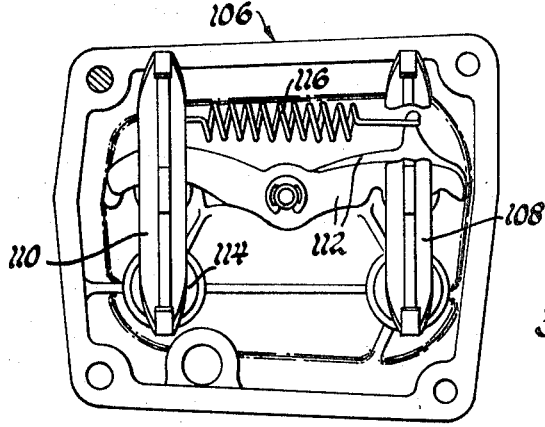
FIG. 8 is an inside view of the side cover assembly shown in FIG. 7.

A side cover assembly 106 (FIGS. 7 and 8) includes the reverse-first shift fork 108 and the second-third shift fork 110 (FIG. 8) and may include interlock levers 112, shift shafts 114 and a spring 116 similar to those fully illustrated and described in U.S. Pat. No. 3,264,894, issued on Aug. 9, 1966 in the names of G. Popovich et al.

METHOD OF ASSEMBLY

Using the above-described components, the three-speed transmission is assembled in the following steps:

A. The synchronizing devices 40 and 46 and the gears 38, 42, 44 and 48, along with the splined hub 50, are assembled in the order illustrated in FIG. 1 on the main shaft 24. The gear cluster 78, including countershaft gears 80, 82, 84 and 86, along with the retainer 66, is mounted on the countershaft 58. The countershaft gears 80, 82, 84 and 85 are then placed in mesh with their cooperating gears, main shaft gears 38, 42, 44 and 48, respectively. The splined end portions 27 of the main shaft 24 is then inserted through the opening 28 until the splines 27 mesh with the splined sleeve 30. At this point, the forward end 60 of the countershaft 58 will have been aligned with and inserted into the pocket 62 in the rear wall 36 of the clutch housing 12. The main shaft and countershaft assemblies will remain suspended in this position, extending from the rear wall 36 of the clutch housing 12.

B. The forward gasket 17 and the transmission case 14, which has the reverse idler shaft 88 and the gear 92 mounted in the opening 90 thereof, are then mounted over the main shaft and countershaft assemblies, abutted against the rear wall 36 of the clutch housing 12 and aligned and secured thereto by body-fitting ⅜-inch washer head bolts 118. Openings 53 and 74, formed in the rear wall 56 of the transmission case 14, will have received the extension 98 of the main shaft 24 and the end 72 of the countershaft 58, the extension 98 being supported in the wall 56 by bearings 52.

C. The speedometer drive gear 96 is then mounted on the extension 98 of the main shaft 24.

D. The rear gasket 17 and the extension housing 16 are then mounted around the extension shaft 98, abutted against the rear wall 56 of the transmission case 14, and secured thereto by ⅜-inch washer head bolts 120. The exterior rearward end 122 of the extension shaft 98 is supported by the bearings 100 at the rear of the extension housing 16.

E. The side cover assembly 106 is then mounted on the transmission case 14, with the internal R–1 and two to three shift forks 108 and 110 thereof aligned in a neutral position for engagement with the first and two to three synchronizing devices 46 and 40, respectively.

FOUR-SPEED TRANSMISSION

Figure 5:
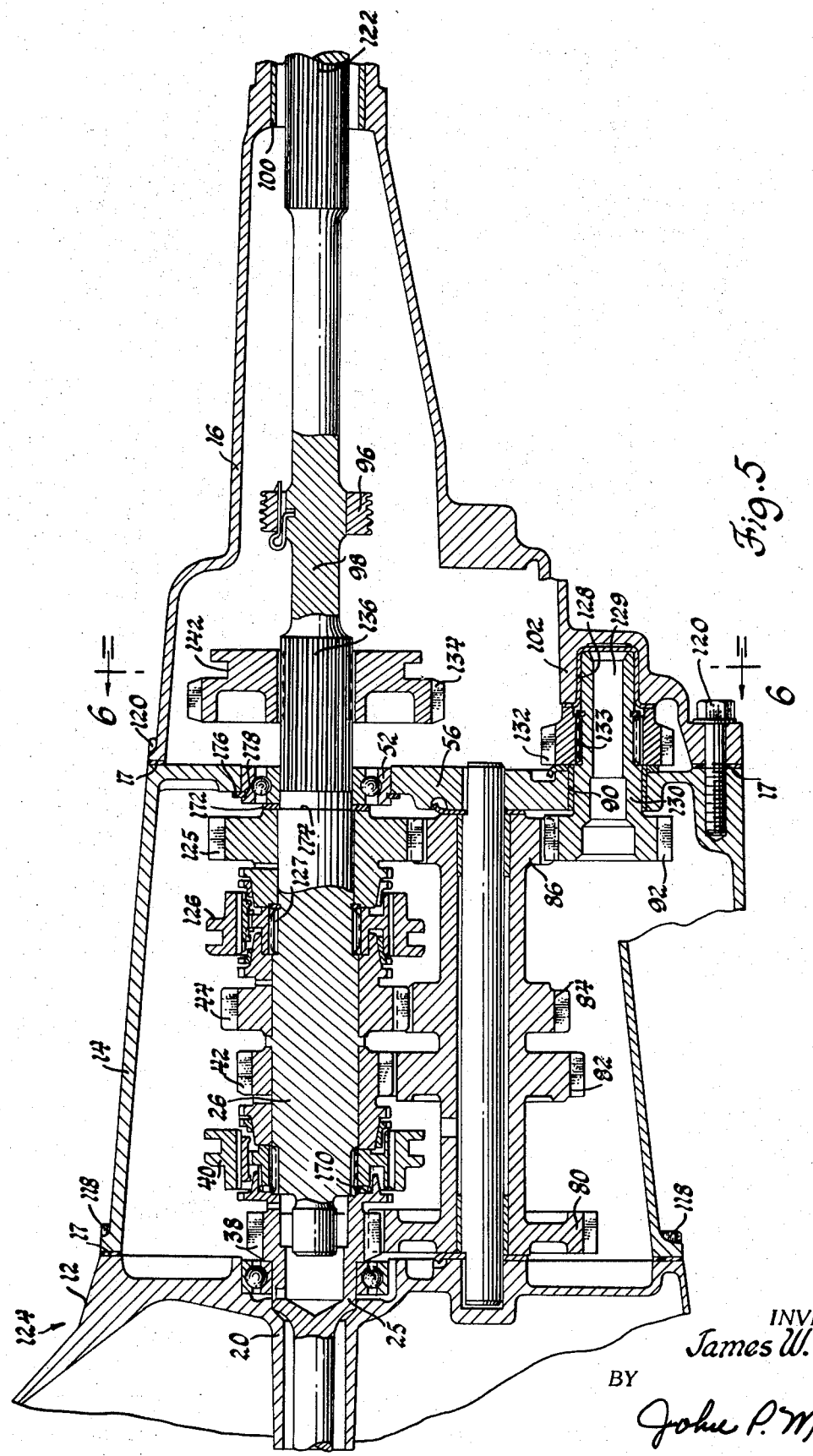
FIG. 5 is a fragmentary cross-sectional view of a four-speed transmission embodying the invention.

Referring now to FIG. 5, it may be noted that the four-speed transmission assembly 124 utilizes the same clutch housing 12, transmission case 14, and extension housing 16, as described above for the three-speed transmission. The gear 48 and the hub 50 of FIG. 1 are replaced by a first speed ratio output gear 126 and the first-second synchronizing device 126 is driven directly by the main shaft portion 26 by means of splines 127. It is merely necessary to form an opening 128, as by drilling, in the boss 102 for the insertion of the end 129 of a now longer reverse idler shaft 130 which extends through the opening 90 formed in the rear wall 56 of the transmission case 14. An additional reverse idler gear 132 is mounted on splines 133 formed on the shaft 130.

Figure 6:
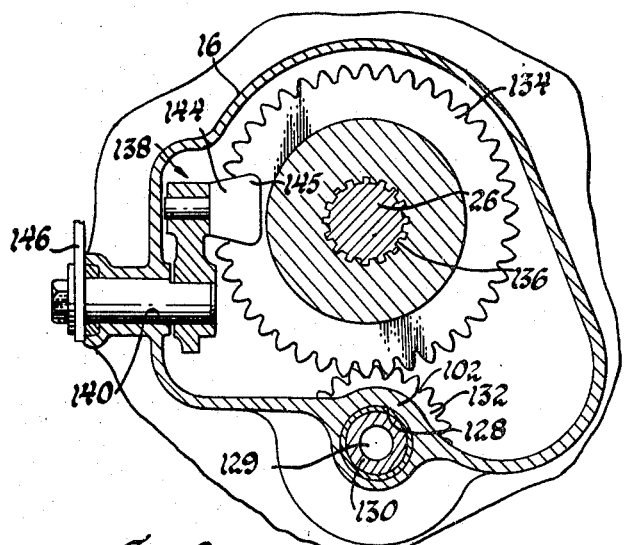
FIG. 6 is a cross-sectional view taken along the plane of line 6—6 of FIG. 5, and looking in the direction of the arrows.

A reverse output gear 134 is mounted on splines 136 formed on the extension 98 of the rear portion 26 of the main shaft 24 prior to step (C) described above, i.e., prior to the mounting of the speedometer drive gear 96. The reverse output gear 134 is slidably moved along the splines 136 to mesh with the reverse idler gear 132 by means of a reverse shift mechanism 138 (FIG. 6). The latter is mounted through an opening 140 formed in the extension housing 16 for cooperation with a synchronizer groove 142 (FIG. 5) formed adjacent the reverse output gear 134.

The assembly of the extension housing 16, when applied to the four-speed transmission, requires, in the process of step (D) above, moving the reverse shift fork 144 (FIG. 6) of the reverse shift mechanism 138 to a forward attitude which permits the innermost edge 145 thereof to fit in the synchronizer groove 142. The reverse shift fork 144 is then manually returned to a neutral position by a lever 146 prior to the extension housing 16 and the rear gasket 17 being abutted against the rear wall 56 of the transmission case 14 and secured thereto by the bolts 120. Once assembled, when the lever 146 is rotated so as to move the shift fork 144 forward, the reverse output gear 134 engages the reverse idler gear 132 for "REVERSE" drive.

The output gears 125, 44 and 42 in the transmission case 14 now become first, second and third ratio output gears, respectively, these gears (gear 125 in lieu of gear 48 of FIG. 1) having been reverse, first and second ratio output gears, respectively, in the three-speed transmission.

FIVE-SPEED TRANSMISSION

Figure 9:
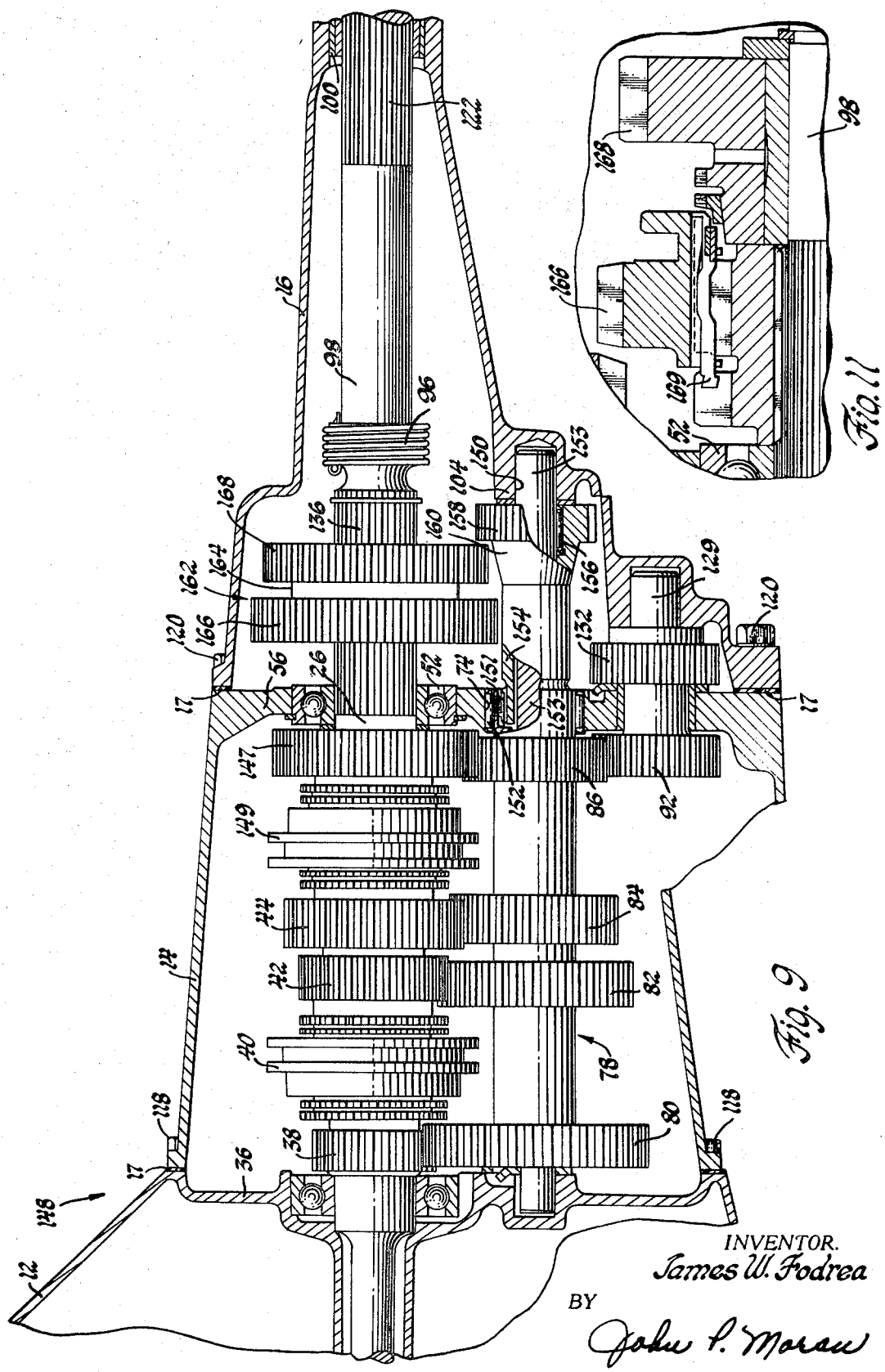

Referring now to FIG. 9, it may be noted that the gear 48 and the hub 50 of FIG. 1 are replaced by a second speed ratio output gear 147 in the five-speed transmission assembly 148, and the second-third synchronizing device 149 is driven directly by the main shaft portion 26 through the splines 127.

To adapt the transmission case 14 and the extension housing 16 for use with the five-speed transmission, it is merely necessary to form a pocket or opening 150, as by drilling, in the boss 104 of the extension housing 16 and to enlarge the opening 74 formed in the rear wall 56 of the transmission case 14. The gear cluster 78 is formed, for use in the five-speed transmission, to include an internally splined extension 151 rotatably mounted on needle bearings 152 in the enlarged opening 74, and a longer countershaft 153 extends through the opening 74 and into the pocket 150. This permits the addition of an externally splined extension shaft 154 on the internally splined extended end 151 of the gear cluster 78 around the longer countershaft 153. The extension shaft 154 is supported on the extended portion of the countershaft 153 adjacent the drilled opening 150 by needle bearings 156, and includes a new first speed ratio input gear 158 formed on the rear end 160 thereof.

In the lieu of the reverse output gear 134 of FIG. 5, a nonsynchronized reverse output and first ratio output duplex gear 162 is mounted on the splines 136 formed on the extension 98 of the main shaft 24. The shift mechanism 138 (FIG. 6), which now provides for shifting into either "REVERSE" or "FIRST," is mounted in the same manner in the groove 164 formed between the reverse output gear portion 166 and the first ratio output gear portion 168, as was described above relative to the four-speed transmission shifter groove 142. Once assembled, when the lever 146 (FIG. 6) is rotated so as to move the shift fork 144 forward, the reverse output gear portion 166 of the duplex gear 162 engages the reverse idler gear 132 for "REVERSE" drive, and when rotated so as to move the shift fork 144 rearward, the first ratio output gear portion 168 of the duplex gear 162 engages the input gear 158 for the lowest or first ratio "FORWARD" drive.

FIG. 11 illustrates the fully synchronized first ratio output version of the five-speed transmission with a synchronizer plate 169 associated with the first ratio output gear 168 in the usual manner.

The output gears 147, 44 and 42 in the transmission case 14 become second, third and fourth ratio output gears, respectively, these gears (gear 147 in lieu of gear 48 of FIG. 1) having been first, second and third ratio output gears, respectively, in the four-speed transmission and reverse, first and second ratio output gears, respectively, in the three-speed transmission.

Referring now to FIG. 5, and applicable to FIG. 9 also, it may be noted that: (1) a thrust bearing 170 is mounted around the main shaft rear portion 26 adjacent the forward end of the front synchronizing device 40; (2) a retainer ring 172 is mounted adjacent a small shoulder 174 formed on the shaft 26 between the bearings 52 and the adjacent gear face; and (3) a retainer ring 176 is mounted in a groove 178 on the bearings 52 adjacent the inside face of the rear wall 56 of the transmission case 14. The thrust bearing 170 and the rings 172 and 176 eliminate the need for the retainer rings 54, 55 and 57 of FIG. 2 secured respectively to the main shaft rear portion 26, the transmission case 14 and the main shaft rear portion 26. The bearing 170 serves to absorb any forward thrust of the main shaft rear portion 26. The bearing 170 and the rings 172 and 176 may be substituted in the FIGS. 1 and 2 structure in place of the prior art retainer rings 54, 55 and 57 shown therein.

As has been described above, the clutch housing 12, the transmission housing 14 and the extension housing including an open front portion and an integrally cast rear wall. The rear wall of the clutch housing 12 and 16 are formed by a die casting process, with each housing including an open of the transmission housing 14 serve as the forward walls of the transmission housing 14 and the extension housing 16, respectively. As was indicated above relative to FIGS. 6 and 7, the side cover assembly 106, including a pair of shift fork mechanisms, is mounted on the housing 14, and a single shift mechanism 138 is mounted on the extension housing 16, for actuating various synchronizing devices within the transmission. This, of course, requires that there be openings and various other exterior configurations formed on the housings 14 and 16. Such openings and exterior configurations are possible in the die casting process by utilizing a die having a slidably movable side portion, including forward extending protrusions which serve to form the required openings through the walls of the housings. Die protrusions may also be required adjacent the shift mechanism windows or openings to blend the framelike flanges therearound with the exterior transmission body. When slid into place, the die protrusions not only form the windows or openings, but are abutted against the side of the usual metal core, thereby permitting the outer surface of the core to be flush with the generally circular housing interior for ready withdrawal after the pouring process is complete. The slidable die portion is then retracted to permit the withdrawal of the housing casting. Hence, projections or recesses on the housing 14 or 16 exteriors, or openings or windows therein, need not interfere with the above-described die casting approach to forming a readily usable and very versatile clutch and transmission casing.

THE FIG. 10 MODIFICATION

Figure 10:
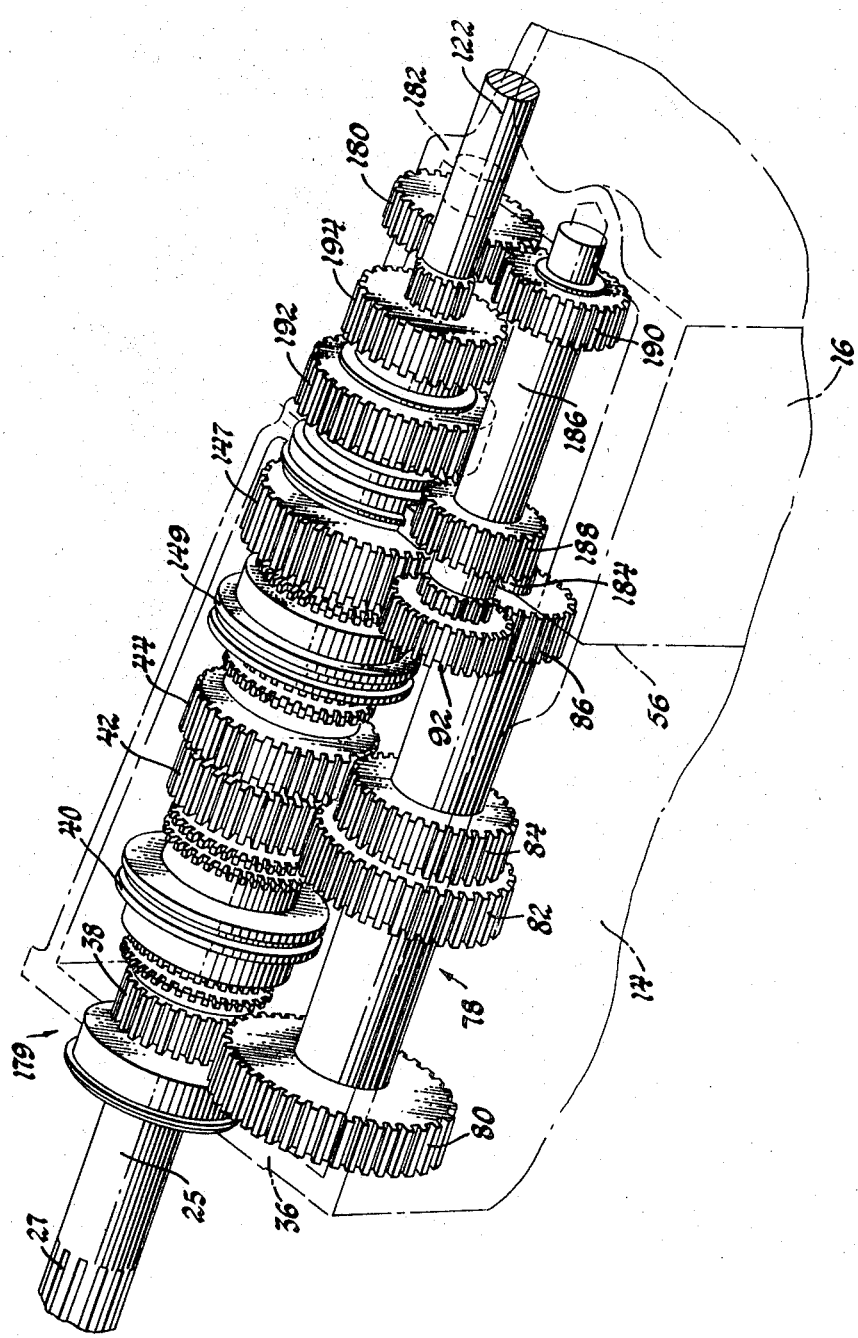
FIG. 10 is a fragmentary cross-sectional view of a modification of FIG. 9.

The FIG. 10 five-speed structure 179 differs from that of FIG. 9 in that: (1) an additional first speed ratio idler gear 180 is individually rotatably mounted on a rear wall 182 of the extension housing 16; (2) the countershaft 184 terminates at the rear wall 56 of the transmission case 14, rather than extending therethrough into the extension housing 16; and (3) the reverse idler shaft 186 includes a reverse idler gear 188 and a first speed ratio idler gear 190. In operation, the rear countershaft gear 86 drives the reverse idler gear 92 in the transmission case 14, and the first speed ratio idler gear 190 in the extension housing 16 drives the individually mounted first speed ratio idler gear 180.

The reverse output and first speed ratio output duplex gears 192 and 194 are shown in "NEUTRAL." When moved forward, the reverse output gear 192 engages the reverse idler gear 188 for "REVERSE" drive, and when moved rearward, the output gear 194 engages the first speed ratio idler gear 180 for the lowest or first ratio "FORWARD" drive.

It should be apparent that the invention provides a novel transmission arrangement which is readily convertible for use with improved three-, four-, or five-speed sliding gear transmission assemblies, any one of which may be readily assembled directly on the motor vehicle, eliminating the need for separate transmission assembly facilities.

While various embodiments of the invention have been shown and described, it is apparent that other modifications thereof are possible.

I claim:

1. In a transmission; a clutch housing including a rear wall, an input shaft aperture and a support shaft aperture formed in said rear wall; an input shaft having an input gear, an internal pilot bearing formed in said input gear; a bearing rotatably supporting and axially locating said input shaft in said input shaft aperture with said input gear outside of said rear wall of said clutch housing; an output shaft aligned with and operatively connected to said input shaft; a plurality of output gears rotatably mounted on said output shaft, a plurality of clutching means each operatively connected between one of said output gears and said output shaft and said output shaft and said input gear being selectively operable to provide each of a plurality of ratio drives; a cluster gear having a driven gear for meshing with sad input gear and a driving gear for meshing with each of said output gears, bearing means and a support shaft rotatably supporting through said bearing means said cluster gear for rotation on said support shaft; and idler gear and idler shaft with said idler gear being mounted on said idler shaft; a transmission housing having a smooth internal surface which tapers from a smaller portion at the base to a larger opening at the lip thereof so that said internal surface is readily draftable with a one-piece core and an external surface of said transmission housing which is readily castable; said transmission housing having a rear wall, an output shaft aperture, an idler shaft aperture and a support shaft aperture formed in said rear wall of said transmission housing; said support shaft being mounted in said support shaft apertures in said rear walls of said clutch housing and said transmission housing; means axially and rotatably fixing said support shaft on said rear wall and said support shaft extending a predetermined distance into said support shaft aperture in said rear wall of said clutch housing; bearing means rotatably mounting and axially positioning said output shaft in said output shaft aperture in said rear wall of said transmission housing; said output shaft having an external front pilot portion extending into said internal pilot bearing of said clutch housing a distance less than said predetermined distance.

2. For use with a motor vehicle clutch mechanism including a clutch housing, a multispeed ratio transmission comprising a transmission case mounted on said clutch housing such that the outermost portion of said clutch housing forms the forward wall of said transmission case, first and second openings formed in said outermost portion of said clutch housing, an extension housing mounted on said transmission case such that the outermost portion of said transmission case forms the front wall of said extension housing, first and second openings formed in said outermost portion of said transmission case and axially aligned with said first and second openings, respectively, in said outermost portion of said clutch housing, a main shaft having a front portion mounted through said first opening in said clutch housing and a rear portion mounted through said first opening in said transmission case, an input gear and first, second and third ratio output gears mounted on said main shaft, retaining means for preventing rearward movement of said rear portion of said main shaft, bearing means adjacent the forward end of said rear portion for absorbing the forward thrust of said main shaft rear portion, a countershaft mounted in said aligned second openings, a drive gear and first, second and third input gears mounted on said countershaft, synchronizing means operatively connected to said input gears for manually selecting a desired gear ratio, a third opening formed in said outermost portion of said transmission case, a reverse idler shaft mounted through said third opening, first and second reverse idler gears mounted on said reverse idler shaft, one in said transmission case and the other in said extension housing, a reverse output gear mounted on said main shaft in said extension housing for at times meshing with said second reverse idler gear, and shifter means mounted on said extension housing for at times sliding said reverse output gear into mesh with said second reverse idler gear.

3. A multispeed ratio transmission comprising a die cast clutch housing, a die cast transmission case mounted on said clutch housing, a die cast extension housing mounted on said transmission case, said clutch housing serving as the forward wall of the transmission case and having first and second openings formed therein, said transmission case serving as the front wall of the extension housing and having first and second openings formed therein and axially aligned with said first and second openings, respectively, in said clutch housing, a main shaft mounted through said aligned first openings, a countershaft mounted in said aligned second openings, a first pocket formed in said extension housing and aligned with said aligned second openings, an extension shaft splined at one end to said countershaft and having the other end thereof mounted in said opening in said extension housing, a first speed ratio input gear formed on said extension shaft, a third opening formed in said transmission case, a second pocket formed in said extension housing and aligned with said third opening, a reverse idler shaft rotatably mounted in said third opening and said second pocket, a reverse idler gear mounted on said reverse idler shaft, and a reverse and first ratio duplex output gear mounted on said main shaft in said extension housing for alternately meshing with said first speed ratio input gear and said reverse idler gear.

4. A multispeed ratio transmission comprising a die cast clutch housing, a die cast transmission case mounted on said clutch housing, a die cast extension housing mounted on said transmission case, said clutch housing serving as the forward wall of the transmission case and having first and second openings formed therein, a cylindrical throwout bearing support sleeve formed around said first opening and extending into said clutch housing, said transmission case serving as the front wall of the extension housing and having first and second openings formed therein and axially aligned with said first and second openings, respectively, in said clutch housing, a main shaft mounted through said aligned first openings, an input gear and second, third and fourth ratio output gears mounted on said main shaft, a countershaft mounted in said aligned second openings, a drive gear and second, third and fourth ratio input gears mounted on said countershaft, synchronizing means operatively connected to said input gears for manually selecting a desired gear ratio, an opening formed in said extension housing and aligned with said aligned second openings, an extension shaft splined at one end to said countershaft and having the other end thereof mounted in said opening in said extension housing, a first speed ratio input gear formed on said extension shaft, a reverse idler gear assembly rotatably mounted through said front wall of said extension housing and having an idler gear adjacent each face of said front wall, and a reverse and first ratio duplex output gear mounted on said main shaft in said extension housing for alternately meshing with said first speed ratio input gear and said reverse idler gear in said extension housing.

5. For use with a motor vehicle including a clutch mechanism, a multispeed ratio transmission comprising a main housing, a main shaft extending through said housing and operatively connected to said clutch mechanism, an input gear, second, third and fourth ratio output gears secured to said main shaft, a second-third synchronizing device and a fourth-fifth synchronizing device secured to said main shaft for selectively engaging said output gears, an extension housing mounted adjacent said main housing, said main shaft extending through said extension housing, a combination reverse and first ratio output gear slidably mounted on said main shaft in said extension housing, a countershaft fixed in said main housing and extending into a pocket formed in said extension housing, a drive gear and a second, third and fourth ratio input gear cluster rotatably mounted on said fixed countershaft in said main housing, a first ratio input gear rotatably mounted on said countershaft in said extension housing and connected to said gear cluster, a reverse idler gear shaft rotatably mounted in said extension housing and having a first reverse idler gear formed on the end thereof in said main housing and a second reverse idler gear mounted thereon in said extension housing, a reverse-first shifter device operatively connected to said combination reverse and first gear for permitting alternate slidable engagement of said combination gear with said first ratio input gear and said second reverse idler gear.

6. The transmission described in claim 5, wherein said first gear is nonsynchronized.

7. The transmission described in claim 5, wherein said first gear is fully synchronized.

8. For use with a motor vehicle clutch mechanism including a clutch housing, a multispeed ratio transmission comprising a transmission case mounted on said clutch housing such that the outermost portion of said clutch housing forms the forward wall of said transmission case, first and second openings formed in said outermost portion of said clutch housing, an extension housing mounted on said transmission case such that the outermost portion of said transmission case forms the front wall of said extension housing, first and second openings formed in said outermost portion of said transmission case and axially aligned with said first and second openings, respectively, in said clutch housing, a main shaft having a front portion mounted through said first opening in said clutch housing and a rear portion mounted through said first opening in said transmission case, an input gear and second, third and fourth ratio output gears mounted on said rear portion of said main shaft, retaining means for preventing rearward movement of said rear portion of said main shaft, bearing means adjacent the forward end of said rear portion for absorbing the forward thrust of said rear portion, a countershaft mounted in said aligned second openings, a drive gear and second, third and fourth ratio input gears mounted on said countershaft, synchronizing means operatively connected to said input gears for manually selecting a desired gear ratio, an aperture formed in said extension housing and aligned with said aligned second openings, an extension shaft splined at one end to said countershaft and having the other end thereof mounted in said aperture in said extension housing, an input gear formed on said extension shaft, a third opening formed in said outermost portion of said transmission case, a reverse idler shaft mounted through said third opening, first and second reverse idler gears mounted on said reverse idler shaft, one in said transmission case and the other in said extension housing, and a reverse and first ratio duplex output gear mounted on said main shaft in said extension housing for alternately meshing with said last-mentioned input gear and said second reverse idler gear.

9. A transmission adaptable for multispeed ratios comprising a die cast clutch housing, a die cast transmission case mounted on said clutch housing, a die cast extension housing mounted on said transmission case, said clutch housing serving as a forward wall of said transmission case and having first and second openings formed therein, said transmission case serving as the front wall of said extension housing and having third and fourth openings formed therein and axially aligned with said first and second openings, respectively, in said clutch housing, a mainshaft mounted through said axially aligned first and third openings, a countershaft mounted in said axially aligned second and fourth openings, a first solid portion formed in said extension housing suitable for the formation of a first shaft-supporting pocket therein axially aligned with said axially aligned second and fourth openings, a fifth opening formed in said transmission case, a reverse idler shaft rotatably mounted in said fifth opening, a reverse idler gear mounted on said reverse idler shaft and operatively connected to said countershaft, a second solid portion formed in said extension housing suitable for the formation of a second shaft-supporting pocket therein axially aligned with said fifth opening, said first and second solid portions serving to adapt a conventional three-speed transmission for use as a four- and/or five-speed transmission.

10. The transmission described in claim 9, and a reverse idler extension shaft extending from said reverse idler shaft into said second shaft-supporting pocket, a second reverse idler ear mounted on said reverse idler extension shaft, and a reverse output gear mounted on said mainshaft in said extension housing for meshing with said second reverse idler gear.

11. A transmission adaptable for multispeed ratios comprising a die cast clutch housing, a die cast transmission case mounted on said clutch housing, a die cast extension housing mounted on said transmission case, said clutch housing serving as a forward wall of said transmission case and having first and second openings formed therein, said transmission case serving as the front wall of said extension housing and having third and fourth openings formed therein and axially aligned with said first and second openings, respectively, in said clutch housing, a mainshaft mounted through said axially aligned first and third openings, a countershaft mounted in said axially aligned second and fourth openings, a first solid portion formed in said extension housing suitable for the formation of a first shaft-supporting pocket therein, said first shaft-supporting pocket to be axially aligned with said axially aligned second and fourth openings, a first extension shaft adapted to be splined at one end thereof to said countershaft and to have the other end thereof mounted in said first shaft-supporting pocket in said extension housing, a first speed ratio input gear adapted to be mounted on said extension shaft, a fifth opening formed in said transmission case, a reverse idler shaft rotatably mounted in said fifth opening, a first reverse idler gear mounted on said reverse idler shaft and operatively connected to said countershaft, a second solid portion formed in said extension housing suitable for the formation of a second shaft-supporting pocket therein, said second shaft-supporting pocket to be axially aligned with said fifth opening, a reverse idler extension shaft adapted to extend from said reverse idler shaft into said second shaft-supporting pocket, a second reverse idler gear adapted to be mounted on said reverse idler shaft, and a reverse and first ratio duplex output gear adapted to be mounted on said mainshaft in said extension housing for alternately meshing with said first speed ratio input gear and said second reverse idler gear.

12. A transmission adaptable for multispeed ratios comprising a die cast clutch housing, a die cast transmission case mounted on said clutch housing, a die cast extension housing mounted on said transmission case, said clutch housing serving as a forward wall of said transmission case and having first and second openings formed therein, said transmission case serving as the front wall of said extension housing and having third and fourth openings formed therein and axially aligned with said first and second openings, respectively, in said clutch housing, a mainshaft mounted through said axially aligned first and third openings, a countershaft mounted in said axially aligned second and fourth openings, a first solid portion formed in said extension housing suitable for the formation of a first shaft-supporting pocket therein axially aligned with said axially aligned second and fourth openings, a fifth opening formed in said transmission case, a reverse idler shaft rotatably mounted in said fifth opening, a reverse idler gear mounted on said reverse idler shaft and operatively connected to said countershaft, a second solid portion formed in said extension housing suitable for the formation of a second shaft-supporting pocket therein axially aligned with said fifth opening, said first and second solid portions serving to adapt a conventional three-speed transmission for use as a four- and/or five-speed transmission, and a reverse idler extension shaft extending from said reverse idler shaft into said second shaft-supporting pocket, a second reverse idler gear mounted on said reverse idler extension shaft, an extension shaft extending from said countershaft into said first shaft-supporting pocket, a first speed ratio input gear mounted on said extension shaft, and a reverse and first ratio duplex output gear mounted on said mainshaft in said extension housing for alternately meshing with said first speed ratio input gear and said second reverse idler gear.

* * * * *

UNITED STATES PATENT OFFICE
CERTIFICATE OF CORRECTION

PO-1050
(5/69)

Patent No. 3,645,147     Dated February 29, 1972

Inventor(s)  James W. Fodrea

It is certified that error appears in the above-identified patent and that said Letters Patent are hereby corrected as shown below:

On the title or first page of the patent
    -- Assignee: General Motors Corporation, Detroit, Michigan -- has been omitted.

| | | |
|---|---|---|
| Col. 1, at or about line 28, | "spaced" should read -- speed -- |
| Col. 2, at or about line 29, | (before "oil") "on" should read -- an -- |
| " 2, " " " line 44, | "plate 46" should read -- plate 47 -- |
| " 2, " " " line 62, | "chamber 63 id" should read -- chamfer 63 is -- |
| Col. 3, line 3, before "rear" | insert -- a -- |
| " 3, at or about line 18, | (before "axis"), "he" should read -- the -- |
| " 3, at or about line 37, | "85" should read -- 86 -- |
| " 3, at or about line 67, | "two to three" should read -- 2-3 -- |
| " 3, at or about line 69, | "two to three" should read -- 2-3 -- |
| Col. 4, line 3, (first occurrence), | "126" should read -- 125 --. |
| Col. 5, at or about line 36, | the first two sentences of the paragraph should read -- |

(continued)

PO-1050
(5/69)

UNITED STATES PATENT OFFICE
CERTIFICATE OF CORRECTION

Patent No. __3,645,147__   Dated __February 29, 1972__

Inventor(s) __James W. Fodrea__

It is certified that error appears in the above-identified patent and that said Letters Patent are hereby corrected as shown below:

-- As has been described above, the clutch housing 12, the transmission housing 14 and the extension housing 16 are formed by a die casting process, with each housing including an open front portion and an integrally cast rear wall. The rear wall of the clutch housing 12 and the rear wall of the transmission housing serve as the forward walls of the transmission housing 14 and the extension housing 16, respectively. --

Col. 6, Claim 1, at or about line 38, "sad" should read -- said --.

Col. 9, Claim 10, at or about line 21, "ear" should read -- gear --.

Signed and sealed this 5th day of December 1972.

(SEAL)
Attest:

EDWARD M. FLETCHER, JR.
Attesting Officer

ROBERT GOTTSCHALK
Commissioner of Patents